Oct. 10, 1950     J. J. SWANSEY     2,525,246
CHICKEN FEEDER

Filed Feb. 14, 1949     2 Sheets-Sheet 1

Inventor

Jesse J. Swansey

By *Clarence A. O'Brien and Harvey B. Jacobson*
Attorneys

Oct. 10, 1950   J. J. SWANSEY   2,525,246
CHICKEN FEEDER
Filed Feb. 14, 1949   2 Sheets-Sheet 2
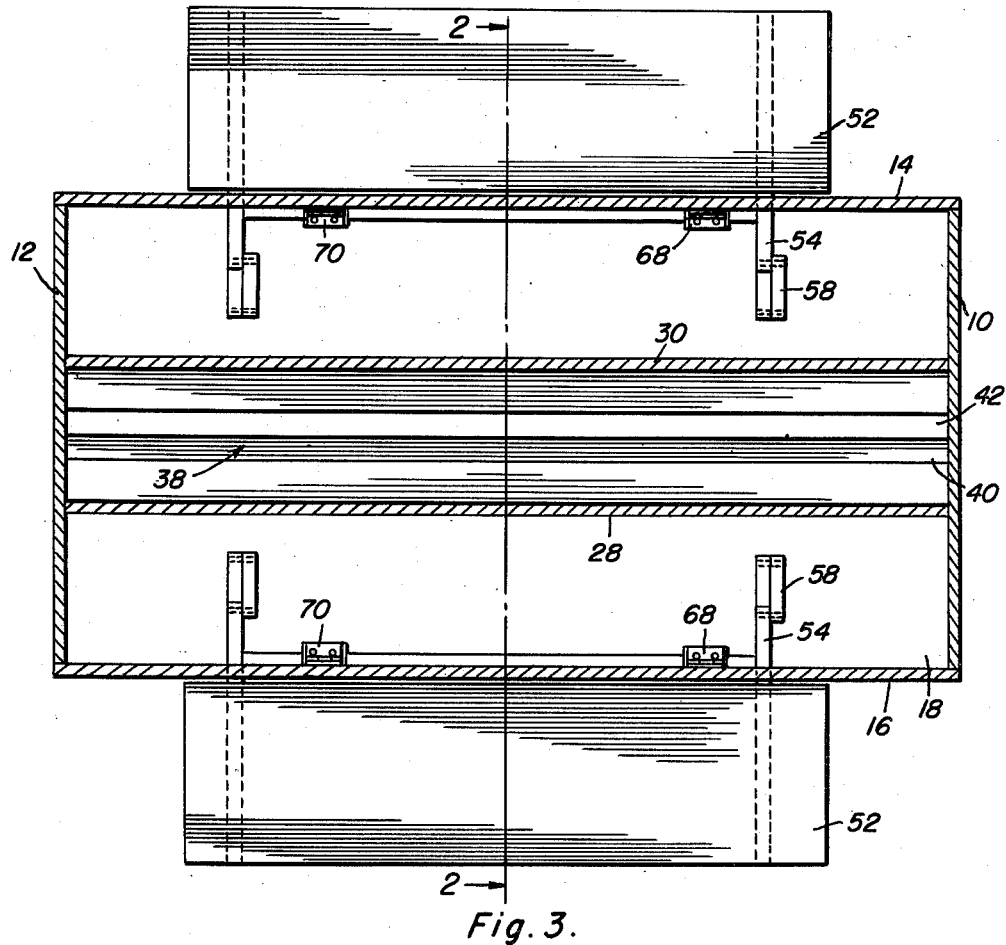
Fig. 3.
Fig. 4.
Fig. 5.
Inventor
Jesse J. Swansey
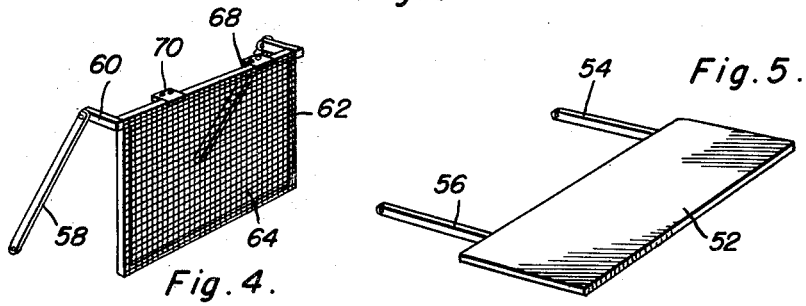
By
Attorneys Patented Oct. 10, 1950

2,525,246

UNITED STATES PATENT OFFICE 2,525,246

CHICKEN FEEDER

Jesse J. Swansey, Bay City, Tex.

Application February 14, 1949, Serial No. 76,271

1 Claim. (Cl. 119—55)

This invention relates to novel and useful improvements in poultry feeders.

An object of this invention is to feed various types of poultry such as chickens, pigeons, ducks, etc., by a poultry actuated ingress device.

Another object of this invention is to store a supply of feed in a manner of safety with relation to rodents and other types of unauthorized animal life.

Another object of this invention is to supply a quantity of feed in a hopper, which hopper is disposed in a housing adjacent the top portion thereof, terminating at a distance from the bottom and to utilize a baffle positioned directly beneath the discharge opening of the hopper for directing the feed toward feeding openings, the openings having foraminous doors hingedly disposed thereover, the doors being actuated by application of a force to a platform extending through the feeding opening, the force being preferably the weight of poultry standing thereon.

Ancillary objects and features of novelty will become apparent to those skilled in the art, in following the description of the preferred form of the invention illustrated in the accompanying drawings, wherein:

Figure 3 is a transverse sectional view taken on the line 3—3 of Figure 2 and in the direction of the arrows;

Figure 4 is a perspective view of a door used for closing the feeding openings; and, Figure 5 is a perspective view of the platform used for actuation of the door shown in Figure 4.

Figure 1:
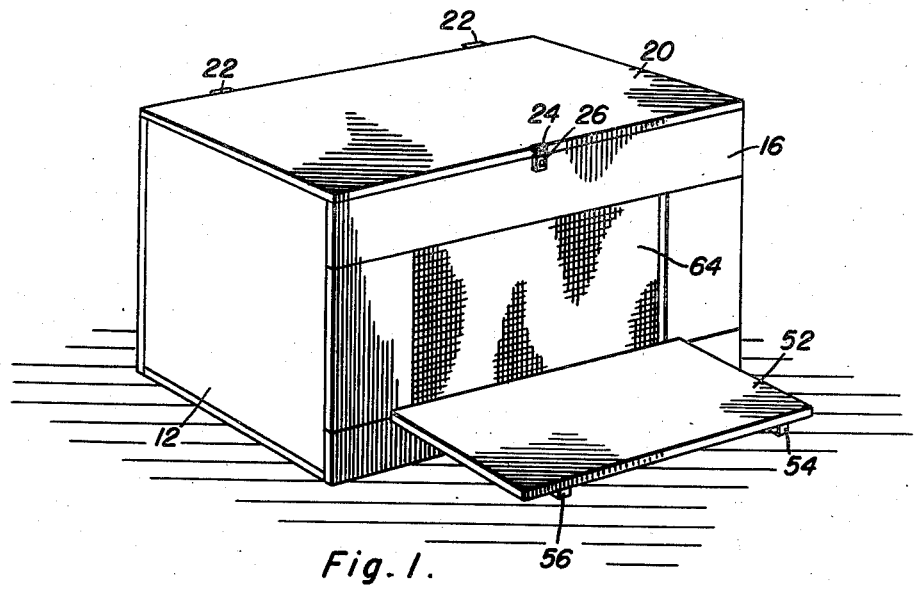
Figure 1 is a perspective view of the preferred form of the invention.

This invention has been developed in order to provide a device for the purpose of maintaining chicken and other types of poultry feed in a protected manner. Often, rodents and other types of undesired animals attack and utilize the feed which is set forth for the purpose of maintaining the chickens or other poultry of a farm. Accordingly, the present invention is adapted to be used for the purpose of protecting the feed yet allowing the poultry to obtain such quantity as will retain the poultry in healthy condition.

A receptacle or housing is utilized which includes ends 10 and 12 respectively which are attached to sides 14 and 16. A bottom 18 is attached to the sides and the ends and the receptacle or housing has an open top. This open top is covered by a supply closure or door 20 which is hinged to the wall 14 by means of conventional hinges 22. A latch keeper in the form of a stud or pin 24 is secured to the forward edge of the closure 20 and is engageable by a latch or hasp 26. This hasp 26 is pivoted to the side 16 by any suitable, conventional pivot pin.

Figure 2:
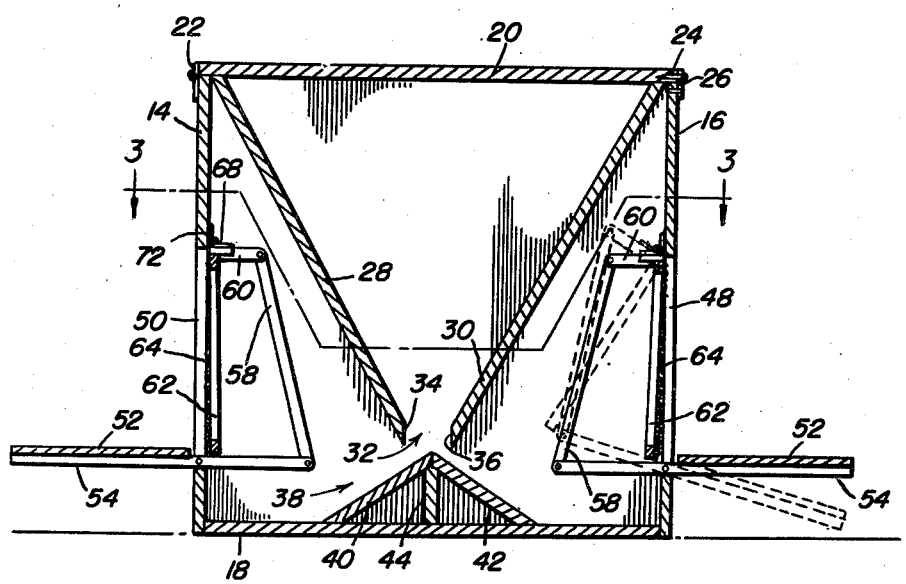
Figure 2 is a sectional view taken on the line 2—2 of Figure 3 and in the direction of the arrows, showing the interior structure of the device.

A hopper composed of a pair of sides 28 and 30 respectively is provided in the said housing or receptacle in order to direct the feed to the central portion of the bottom 18 of the said receptacle or housing. The discharge opening 32 in the said hopper is spaced from the bottom 18, as is seen in Figure 2. It is seen that the lower edges of the baffles 28 and 30 respectively are angular at 34 and 36 respectively, which angle is complemental to the angle of inclination of the baffles 28 and 30 forming the said hopper. Accordingly, the discharge opening 32 has substantially vertical sides 34 and 36 respectively.

A baffle generally indicated at 38 is attached to the bottom 18 by any suitable means and includes baffle portions 40 and 42 respectively. These baffle portions are divergent with respect to the bottom 18, terminating thereon. Further, a support 44 extends longitudinally of the housing or receptacle, supporting the apex of the divergent baffles 40 and 42.

A feeding opening 48 is provided in the side 16. It is noted at this point that any number of feeding openings may be provided in the said side 16 and further, a feeding opening 50 is supplied in the side 14. The said feeding opening 50 may be duplicated, as desired.

Attention is now directed to Figure 5 wherein a platform is disclosed, one of which is utilized for each feeding opening supplied in the receptacle or housing. It is obvious that the said platform consists of a flat member 52 having arms 54 and 56 respectively extending therefrom. As is seen in Figure 2 the utility of the arms 54 and 56 is to mount the said platform within the openings through the utility of conventional pivot pins. A portion of the said platforms extend interior of the housing and another portion thereof extends exterior of the housing. At the end of each arm 54 and 56 a pitman link 58 is attached and the said pitman links also attached to arms 60. The said arms 60 are in turn secured to a frame 62 having a foraminous cover 64 thereon. The frame 62 and foraminous cover 64 forms a door for selectively opening and closing the said feeding openings. Upon application of a force to the platform flat member 52, the arms 54 and 56 are pivotally actuated, which actuation is transmitted to the arms 60 through the medium of the pitman links 58. Attached at the upper end of the frame 62 is a pair of hinge plates 68 and 70 respectively operating with complemental hinge plates 72. Accordingly, the doors are hingedly mounted to be swung inwardly of the housing in order that chickens or other type poultry may feed.

Due to the foraminous members 64 in the said doors the poultry is able to visualize the grain within the housing thereby allowing the same to approach the grain and open the door for feeding purposes.

While there has been described and illustrated a preferred form of the invention, it is apparent that variations may be made without departing from the spirit thereof.

Having described the invention, what is claimed as new is:

In a poultry feeder, a housing having a bottom, open top, ends and sides, at least one of said sides having a feeding opening, a hopper attached to said ends having a discharge opening spaced from said bottom, a baffle disposed directly beneath said discharge opening and attached to said housing bottom, a foraminous door pivotally mounted on said one of said sides above said feeding opening and covering said feeding opening, a platform pivotally mounted intermediate its ends in said feeding opening and having a portion thereof extending within said housing and a portion extending exterior of said housing, a rod attached to said foraminous door adjacent the top thereof, a pitman disposed in said housing and connecting said rod and the inner end of said platform whereby upon application of a downward force on the platform exterior of said housing the door is opened for feeding, and a supply closure hingedly secured to one of said sides covering said open top and a latch secured to the opposite side and said closure.

JESSE J. SWANSEY.

REFERENCES CITED

The following references are of record in the file of this patent:

UNITED STATES PATENTS

| Number | Name | Date |
|---|---|---|
| 928,400 | Poh | July 20, 1909 |
| 1,404,543 | Rego | Jan. 24, 1922 |
| 1,454,352 | Thompson | May 8, 1923 |
| 1,652,727 | Ochsner | Dec. 13, 1927 |
| 1,795,712 | Cone | Mar. 10, 1931 |